United States Patent [19]

Frölichsthal

[11] 4,136,571
[45] Jan. 30, 1979

[54] MANURE DISPOSER INSTALLATION

[76] Inventor: Herbert Frölichsthal, Hönigthal 54, A 8010 Graz, Austria

[21] Appl. No.: 778,025

[22] Filed: Mar. 15, 1977

[30] Foreign Application Priority Data

Mar. 26, 1976 [AT] Austria .................................. 2219/76

[51] Int. Cl.² ............................................ F16H 27/02
[52] U.S. Cl. ................... 74/89.15; 74/421 A; 74/424.8 R
[58] Field of Search ........ 74/89.15, 424.8 R, 424.8 B, 74/421 A

[56] References Cited

U.S. PATENT DOCUMENTS

| 1,313,537 | 8/1919  | Jones      | 74/421 A   |
| 3,153,158 | 10/1964 | Schmitter  | 74/421 A   |
| 3,485,110 | 12/1969 | Beck       | 74/424.8 R |
| 3,802,281 | 4/1974  | Clarke     | 74/89.15   |
| 3,803,927 | 4/1974  | Lawler     | 74/89.15   |
| 3,937,295 | 2/1976  | Wright     | 74/89.15   |
| 4,041,795 | 8/1977  | Rekoff, Jr.| 74/424.8 B |

Primary Examiner—Benjamin W. Wyche
Assistant Examiner—Wesley S. Ratliff, Jr.
Attorney, Agent, or Firm—Cushman, Darby & Cushman

[57] ABSTRACT

The disclosure embraces a manure disposal installation including an electric motor having a fixed stator and a rotor which is attached to a hollow cylinder on the interior of which is fixedly secured a threaded nut; a threaded shaft passes through the center of the cylinder that is fixed to the rotor whereby rotation of the rotor will effect linear translation of the shaft; to one end of the shaft is attached a coupling means for coupling the shaft to a manure shovel rod to which is secured a manure shovel; the shaft is provided adjacent its ends with non-threaded, reduced diameter portions so that in the event that the direction of rotation of the rotor, upon the shovel reaching its limit of travel, is not automatically changed, damage to the associated mechanisms will be avoided since the reduced diameter portion of the shaft will come into juxtaposition with the nut fixed on the hollow cylinder whereby further movement of the shaft is prevented.

8 Claims, 7 Drawing Figures

U.S. Patent  Jan. 30, 1979  Sheet 1 of 2  4,136,571
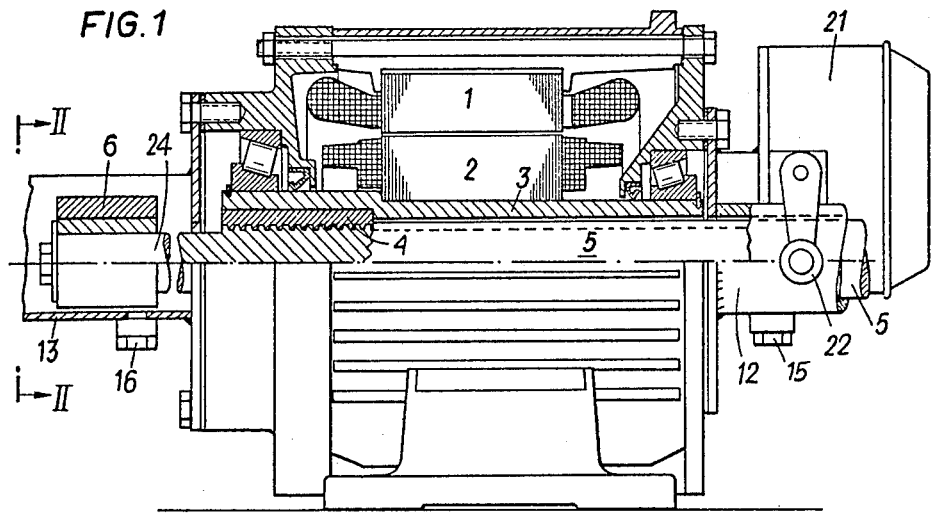
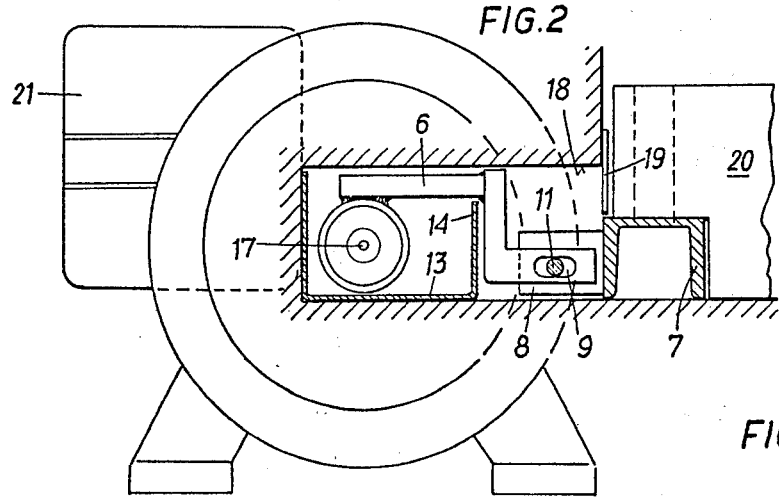
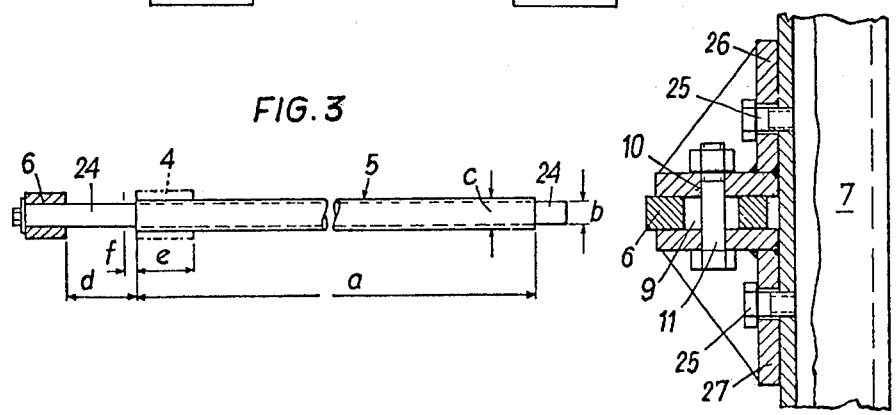

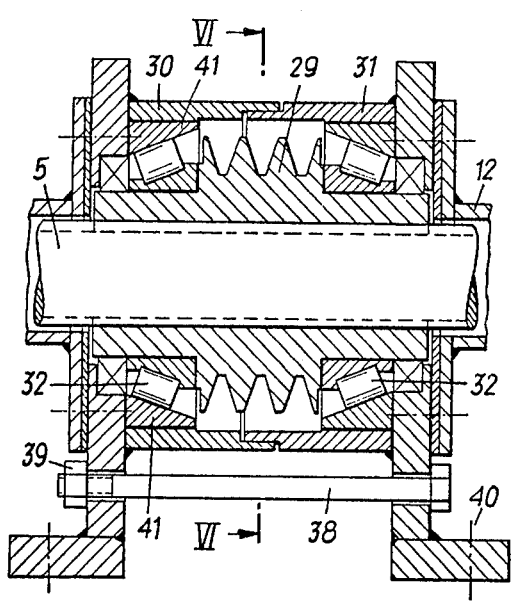
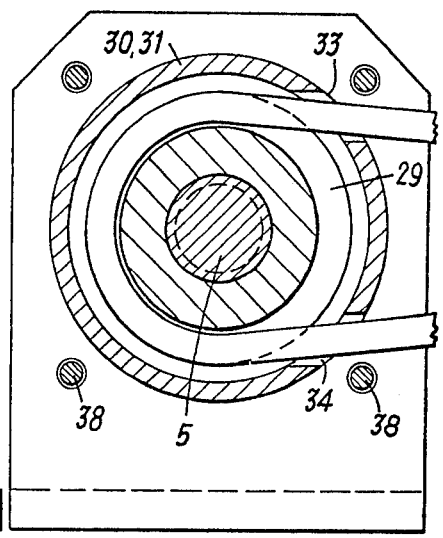
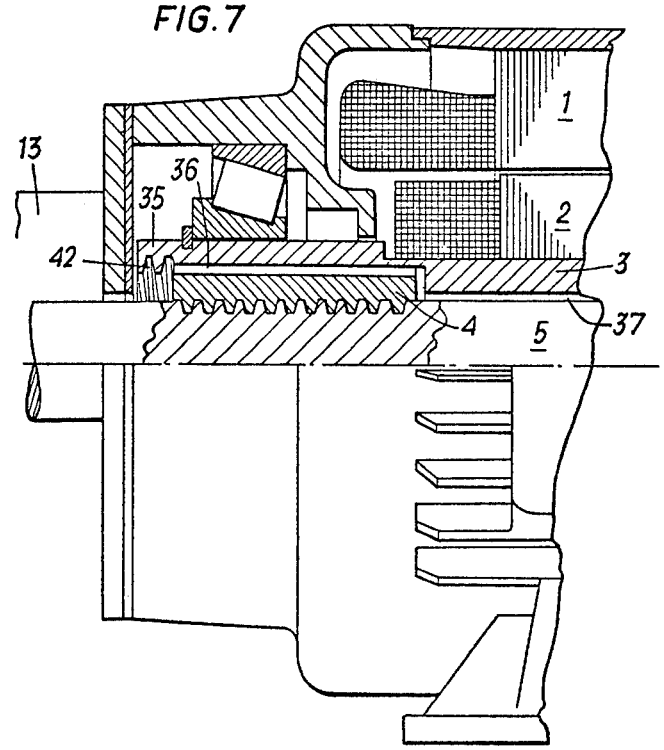

MANURE DISPOSER INSTALLATION

The present invention relates to manure disposal installation or apparatus.

In presently known installations, it has been the practice to provide a connecting rod to which manure shovers are attached to move to and fro over a surface. The connecting rod of such apparatus which are now in use have a stroke or throw of about 2 meters with a speed of approximately 7 meters per minute. In some of these installations, power is transmitted to the shovers by means of a rotating chain whereby the changing of the direction of the movement of the connecting rod is produced by changing the rotation of the chain. However, such drive mechanisms are complicated and expensive. In other arrangements, cog-rails are used as a drive means whereby the to and fro motion is made by changing direction of rotation of the motor. However, these installations are also expensive and inclined to jamming and require low speeds of operation. In situations where the changing of the direction of the motor is involved, not only the power of the rotor, but also the power of the support machine at every change of direction has to be reduced every 20 seconds and then accelerated again.

The subject of the invention is a connecting rod manure disposer installation, the connecting rod is driven by a rotating current motor, whose rotating direction will be changed at every stroke of the connecting rod. The aim of the invention is to avoid the disatvantages of these known installations. The invention consists essentially there-in, that the drive is produced by a winding spindle which is parallel to the connecting rod. This winding spindle is connected with a winding nut. One of the two parts, the winding nut and the winding spindle, is moved by the motor and the other part is nonrotatable and connected to a transporter to the connecting rod. The drive by the winding spindle and winding nut does not need a support machine. If, for example, the winding elevation is 5 mm, and the motor has the rotating number of 1400 tours, the speed of the connecting rod of 7 m/min can be gained. Through the use of the winding spindle or the winding nut with a transporter, connected directly with the connecting rod, a simple construction is produced.

A further advantage of the use of a winding spindle and a winding nut as compared to the use of a cog-rail drive is also that at the screwing of the nut on the spindle, the nut itself cleans the grooves of the shaft so that the danger of blockage through the accumulation of manure is reduced than with a toothed rack drive where one element would take the manure and press it between the teeth of the rack.

In a preferred arrangement, the winding nut is driven directly by the motor whereas the transporter for the manure shover is fixed to the winding spindle or shaft through a linkage with the connecting rod. During use, the winding spindle or shaft is fixed by the transporter against rotation. With such an arrangement, where the mass of the winding nut is small, with every change of direction of rotation of the motor the total mass that must be stopped and accelerated again is reduced.

According to a preferred embodiment of the present invention, a hollow cylinder is attached to the rotor and the winding spindle is attached to this cylinder and is driven thereby with the winding spindle coaxially mounted with the hollow cylinder. This arrangement is very simple and will save space in the overall construction while the use of a hollow cylinder to transfer power from the motor to the winding spindle will result in a reduction in the rotating mass.

According to a further prefered carrying out form of the invention the winding spindle has at least at one end a reduced diameter for the reason explained in more detail hereinafter. The changing of the current direction is produced in the usual way by a pole changer. Such a pole changer can fail or the using of it can not switch. In such cases there will arise big damages in the drive mechanism. Therefore, the reduced diameter portion on the winding spindle is provided so that when it comes into juxtaposition with the winding nut, the winding nut will run idly and motion to the winding spindle will be turned off without stopping the motor. According to the invention the regulation is made in this way, that the winding spindle is placed on the developed end with the transporter over a distance on the main diameter or on smaller diameters, which at least corresponds to the smallest distance between the transporter and the turned off end of the winding nut. In this way a fail of the changer in this position, in which the nut is next to the transporter, will be avoided. On the end of the spindle, which is turned away from the transporter the winding spindle can screw itself out of the winding nut in case of failure of the pole changer and the drive from the running motor is interrupted. Practical is here also the end of the winding spindle put on a smaller diameter respectevly on the main diameter of the winding. This reduced diameter end of the winding spindle remains in the nut and at the start of the drive the shoving of the spindle in the nut will be eased.

According to the invention the end of the winding spindle which is turned away from the transporter can be brought to a pipe, which is connected very close to the box, which contains the winding nut, which end is closed. In the region of the transporter the winding spindle can be layed in a channel, which is open on top but closed on the end. This channel is also closely bound with the box of the winding nut. The pipe and the channel can be partly filled with oil, whereby the hollow space of the pipe is in connection with the hollow space of the channel. In this way a greasing and cooling of the spindle will be attained. Through the compensation of the oil level in pipe and channel this situation will be observed, that the spindle alternating presses the oil from pipe and channel. Above all this connection makes it possible to control in a simple way the oil level in the closed pipe through the conroll of the oil level in the open channel. The transporter, which is fixed on the shover rod has to fulfill its way over the complete stroke of the shoving rod and in spite of all the reaching of the manure to the spindle should be prevented. According to the invention this can be attained through the circumstance, that the transporter extends through a horizontal slit, which is covered by the shoving rod. When also the model form, at which the winding spindle is layed through the hollow cylinder of the motor and the winding nut in the boring of the of the hollow cylinder is placed, because of space problems and because of the reason concerning the simple transformation of power and because of the limiting of the rotating and of the braking and of the accelerating masses is the most profitable, it is according to the invention also possible to store the winding nut separatly and to drive it by the hollow cylinder for instance with a wedge strap. In such a case a commercial motor without any adaption can be used.

In the drawing the invention is explained systematically with examples.

FIG. 1 shows a side view of the motor with the spindle which is layed through the hollow cylinder partly in axial section.

FIG. 2 shows a front view of the motor in the section through the channel which has the winding spindle and the shoving rod according to line II — II.

FIG. 3 shows on small scale a view of the spindle with the transporter.

FIG. 4 shows an top view partly in section of the place to be attached to the transporter on the shoving rod.

FIG. 5 shows an axial section through a winding nut which is separatly stored and driven by a wedge strap. FIG. 6 shows a section according line VI — VI of FIG. 5. FIG. 7 shows a part section of the hollow cylinder.

In the form according to FIG. 1 the manure disposer installation is driven by a rotatory current motor. Its stator is marked with 1 and its rotor is marked with 2. The rotor 2 has a hollow cylinder. In this hollow cylinder 3 is fixed a spindle nut 4 and connected closely with the hollow cylinder 3. The spindle nut is with a spindle 5 in the catcher, so that the spindle 5 will be pushed according to the rotating direction of the spindle nut 4 in one of the two axial directions of the hollow cylinder 3 when a rotating of the spindle will be avoided. On one end of the spindle 5 a stable transporter 6 is fixed. It works together with the shoving rod 7. This is shown in FIG. 2 and 4. The transporter 6 extend into a pocket 8 which is fixed on the shoving rod 7. It has on the end which shows to the shoving rod 7 a gap hole 9. As it is shown in FIG. 4 the pocket 8 which is fixed on the shoving rod 7 is formed by L-profiles 25, 26, 27, which are screwed to the shoving rod 7. The vertical parts in front of the shoving rod 7 have bores 10 in the walls of the pocket 8. A bolt 11 is disposed through the borings 10 and the gap hole 9. It connects the transporter 6 with the pocket 8 and also with the shoving rod 7. Through the connection of the transporter 6 with the shoving rod 7 the spindle 5 does not rotate. If the spindle 5 and the shoving rod 7 are not placed parallel, the gap hole makes it possible, that the transporter 8 can be removed normally to the shoving rod 7. The winding spindle 5 has one end opposite the end which is attached to the transporter which extends out of the hollow cylinder 3 on the other side of the motor and into a closed pipe 12. The interior of this pipe is closely connected with the interior of the hollow cylinder. On the other side of the motor the spindle 5 enters with the end which has the transporter 6 attached thereto in a channel 13 which is open above. The transporter 6 overlaps the edge 14 of the channel 13 which is turned to the shoving rod 7. The channel 13 as well the closed pipe 12 are filled about to ⅓ with oil and screws with which the oil can be removed, are planted. These oil screws 15 should be in the pipes 12 and 16 and in channel 13. The compensation of the level between the oil in pipe 12 and in the channel 13 will be accomplished through an axial boring 17 of the spindle 5 or a connection. The channel 13 layes in a concrete slit 18. This slit is covered by the shoving rod 7 and by a stable dirt shield strip 19 in this way, no dirt can come to the winding spindle 5. The manure shovers are marked with 20. They are fixed in the normal way on the shoving rod 7. A pole changer is 21. Its action lever 22 will be set going in the two end positions of the shoving rod 7 with ordered strokes on the shoving rod 7. This is not shown. The storage and the packing of the hollow cylinder 3 in the motor box is made in the normal way. In FIG. 3 the winding spindle 5 is shown in a complete buildout state. The space a of the spindle 5 has a screw winding and a length from more than 2 meters. To the length a of the spindle which has the extensions 24 are connected. Its outer diameter b is smaller than the main diameter c or have the same size. This is the main diameter in the space a. The nut 4 can during a failing of the pole changer 21 run to operate correctly up to the extensions 24 which have no windings. In such a case the further drive of the spindle 5 will be interrupted. FIG. 5 shows a form, at which the winding nut is not set in a holloww cylinder, but provides for a wedge strap disk 29. At such a shape modifications of a rotatory current are not necessary, because the building of the hollow cylinder 3 in the interior of the motor falls out. The wedge strap disk 29 is stored in a bipartite box 30, 31 with slanting rollerbearings. The parts of the box 30, 31 are stayed by some screw-bolts 38 with nuts 39 in an axial converging way. As FIG. 6 shows, the box 30, 31 has apertures 33, 34 for this reason, that the wedge strap can be pulled through. At the changing of the strap the screw nuts 39 and the base screws 40 will be detached and thereafter the two parts of the box 30 and 31 can be displayed. This can be done without any difficulty because the bearing 32 is a slanting roller-bearing and the trolleys 41 can be taken away together with the parts of the box 30, 31.

FIG. 7 shows a modification of the form according to FIG. 1. The hollow cylinder overlaps with a flange 35 the nut 4 and the spindle 5. This flange has a nut winding 42 which has an incline opposite the the incline of spindle 5. The winding nut 4 shows on its outside put in the hollow cylinder 3, axial running slots 36. The pipe 12 and the channel 13 are connected by these slots 36 and a ring slit 37 between spindle 5 and hollow cylinder 3. If the spindle is pushed in the on the one end closed pipe 12, the oil will be pushed out of the pipe and will be pressed through the ring slit 37 and the slots 36 into the channel 13. The interior winding 42 of the flange 35 which has according to the spindle an opposite rising, works like a cage and pumps the oil out of this space (pipe or channel), in which the winding spindle enters 5 in that space, out of which the winding spindle comes out. In this way a quick level compensation will be achieved. At the same time the hollow cylinder and the motor will be cooled effectively.

I claim:

1. In a manure disposal installation: an electric motor having an armature and a hollow sleeve connected coaxially within the armature for rotation therewith, reciprocatory actuating means, a manure shovel, and connection means connecting said shovel to said actuating means, said actuating means including a screwthreaded shaft passing through said sleeve, a nut fixedly mounted in said sleeve to be driven thereby, said nut having threads for engaging said shaft so that rotation of said nut by said motor effects translation of said screw-threaded shaft.

2. A manure disposal installation as in claim 1 wherein said connection means includes a connecting linkage at one end of said screw-threaded shaft for connection to said shovel.

3. A manure disposal installation as in claim 2 wherein said one end of said shaft is housed in a closed cylindrical member.

4. A manure disposal installation as in claim 2 wherein said screw-threaded shaft has at one end thereof a reduced-diameter non-threaded portion and at its other end thereof, between said means engaging said shovel, a reduced-diameter, non-threaded portion, said reduced-diameter portions being of sufficient length to allow disengagement of the drive connection between the shaft and the nut.

5. A manure disposal installation as in claim 1 including a switching mechanism for changing the direction of rotation of said electric motor.

6. A manure disposal installation as in claim 1 wherein said connection means is located at one end of said shaft, wherein said one end of said shaft is housed in a closed cylindrical member and wherein said cylindrical member and said channel-shaped member are interconnected through annular spaces defined between said shaft and said sleeve.

7. A manure disposal installation as in claim 6 wherein said connection means is located at one end of said shaft and wherein said one end of said shaft is housed in a closed cylindrical member, said cylindrical member and said channel-shaped member being interconnected and being filled with oil.

8. In a manure disposal installation: an electric motor, a manure shovel, and reciprocatory actuating means, said actuating means including a screw-threaded shaft, a nut connected to said electric motor to be rotatably driven thereby, said nut having threads for engaging said shaft so that rotation of said nut by said motor effects translation of said screw-threaded shaft, a portion of said shaft being disposed to reciprocate in a channel-shaped member and connection means connecting said shaft to said shovel, said connection means extending out of said channel-shaped member.

* * * * *